United States Patent
Nakata

[15] 3,671,862
[45] June 20, 1972

[54] FLAT ARMATURE MOVING COIL ELECTRIC METER

[72] Inventor: Toyozo Nakata, 1643 Hiyoshihoncho, Kohoku-ku, Yokohama-shi, Japan

[22] Filed: Dec. 9, 1969

[21] Appl. No.: 883,533

Related U.S. Application Data

[63] Continuation-in-part of Ser. No. 534,937, Jan. 27, 1966, abandoned.

[30] Foreign Application Priority Data

Feb. 5, 1965    Japan.....................................40/7898

[52] U.S. Cl. ..........................................324/150, 324/151 R
[51] Int. Cl............................................G01r 1/20, G01r 1/16
[58] Field of Search ..........................324/154, 151, 144, 150

[56] References Cited

UNITED STATES PATENTS 2,773,239   12/1956   Parker......................................324/150
2,843,825   7/1958    Lush..........................................324/144
3,273,061   9/1966    Rumpelein et al.....................324/151

FOREIGN PATENTS OR APPLICATIONS 597,243     1/1948    Great Britain...........................324/154

Primary Examiner—Alfred E. Smith
Attorney—Stanley Wolder

[57] ABSTRACT

An electrical meter includes a rotatably mounted wheel shaped armature including a channel shaped rim and channel shaped spokes arranged in quadrature. A pair of sector shaped coils of insulator coated wire are nested in seats delineated by pairs of adjacent spokes and the connecting rim section, each coil including a plurality of superimposed flat sector shaped windings of abutting successive convolutions including radially extending legs whose outer ends are connected by circumferentially extending bridge sections. A magnet assembly produces a magnetic field perpendicular to the armature and not extending beyond the ends of the winding radial legs. The areas occupied by the coils are less than the unoccupied areas delineated thereby.

5 Claims, 4 Drawing Figures

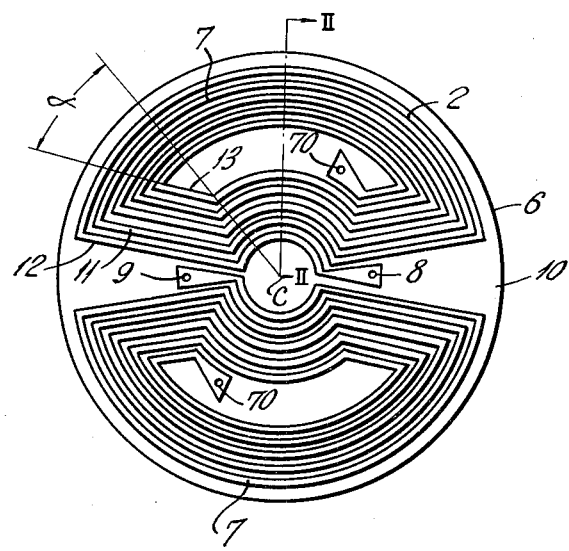
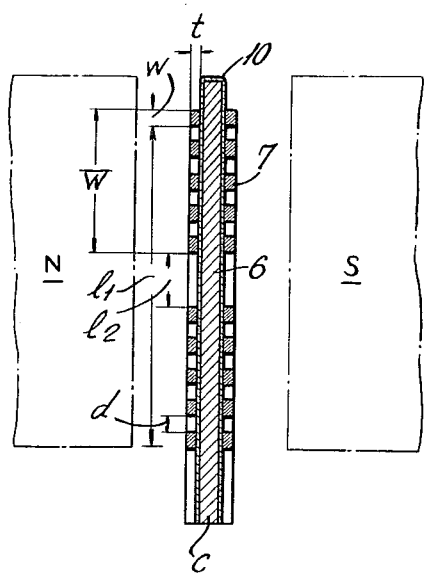
INVENTOR
TOYOZO NAKATA
BY Stanley Wolder
ATTORNEY

PATENTED JUN 20 1972 3,671,862

INVENTOR
TOYOZO NAKATA
BY

ATTORNEY

A FLAT ARMATURE MOVING COIL ELECTRIC METER

The present application is a continuation-in-part of copending application Ser. No. 534,937, filed Jan. 27, 1966, and now abandoned.

The present invention relates generally to improvements in electrical instruments and it relates more particularly to an improved electrical meter of the moving coil type.

Moving coil type electric meters are employed for many purposes, for measuring electric currents and voltages as well as for controlling and actuating various elements in response to the electric current. In many of these applications a meter movement of compact structure, particularly of very little thickness, is often required. A known type of moving coil electric meter of compact construction is one employing as the armature a rotatably supported metal disc coated with an insulating material which in turn carries a flat conductor coil which is applied to the insulating material by an etching procedure. While the aforesaid moving coil electric meter has certain advantages in that the moving coil is very thin and rugged, it possesses an important drawback. The sensitivity and range of measurement of such meters are greatly limited and cannot be employed beyond such limits. Moreover, for reasons which will be hereinafter explained, this range of sensitivity and measurement cannot be extended with the aforesaid structure.

It is therefore a principal object of the present invention to provide an improved electrical instrument.

Another object of the present invention is to provide an improved electric current measuring meter of the moving coil type.

Still another object of the present invention is to provide an improved moving coil electric meter of the type employing a flat disc having a coil mounted on a face thereof.

A further object of the present invention is to provide an electric meter of the above nature characterized by its great range of measurement and sensitivity, ruggedness, compactness and simplicity.

The above and other objects of the present invention will become apparent from a reading of the following description taken in conjunction with the accompanying drawing, wherein:

FIG. 1 is a top plan view of the moving coil of an electric meter of known construction, the coil being etched upon the rotatable disc;

FIG. 2 is an enlarged sectional view taken along line II — II in FIG. 1;

Figure 3:
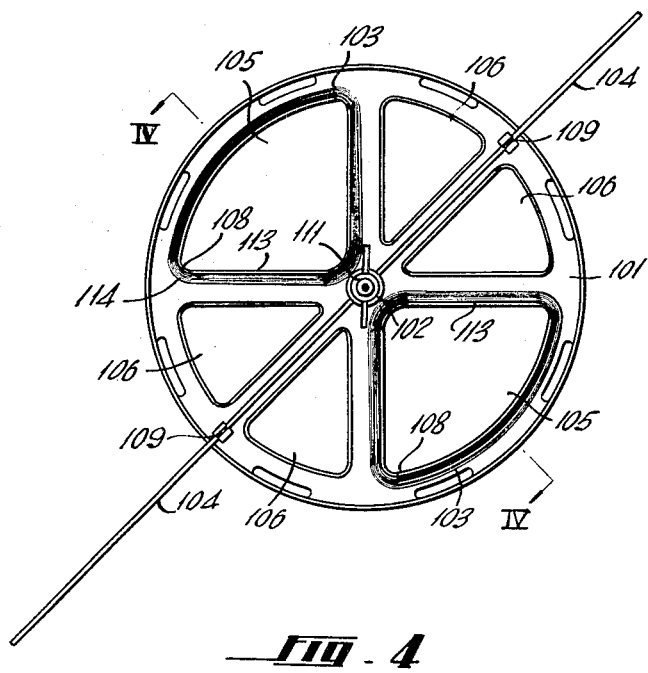
FIG. 3 is a top plan view of the moving coil of a meter embodying the present invention.

Referring now to FIG. 1 and 2 of the drawings which illustrate a meter moving coil of known construction, the coil, per se, is designated by the reference numeral 7 and is etched, in a conventional manner, over a thin insulator layer 10 which coats the opposite faces of the thin metal disc 6. The disc 6 is supported for rotation about its center C. Each of the coils 7 is substantially in the shape of a sector consisting of radially inner and outer arcuate sections 2 concentric with the disc center C and linear or straight sections 11 which extend in approximate radial directions on opposite sides of the arcuate sections 2. The coil 7 constructed and mounted as above rotates with the disc 6 about the center C due to the interaction between the magnetic field established by the suitably located magnets whose polarities are indicated by the designations N and S, and the electric current flowing through the coil 7. As seen in FIG. 2 a coil 7 is generally provided on each face of the disc 6 and these are interconnected by means of their respective terminal sections 70, the opposite terminals 8 and 9 being connected to the current source or voltage to be measured. Accordingly the electric current which flows into the terminal 8 flows through the convolutions of the coils 7 to the terminal 9, and a current or voltage measurement is effected of the current or voltage source connected across the terminals 8 and 9.

In the drawings, the letter $w$ designates the width of the conductor forming the coils 7, $t$ the thickness of the conductor or coil, $d$ the width of the space between adjacent conductors in successive convolutions and $w$ the width of the conductor group or bunch of the full convolution assembly, that is the distance between the relatively outer edges of the plurality of conductors forming a leg of the coil 7.

While the known type of moving coil meter described above possesses certain desirable properties it has drawbacks and disadvantages which are inherent in this structure. First, the etching procedure establishes minimum limits to the conductor width $w$ and to the space width $d$ so that any increase of the number of convolutions within a fixed area is restricted. Further, if the widths $w$ and $d$ are decreased, the coil thickness $t$ must necessarily be decreased. Accordingly, while an increase of the number of convolutions will correspondingly raise the current sensitivity, this will cause the coil resistance to be increased owing to the resulting diminished cross-sectional area of the coil conductor and accordingly diminish the voltage sensitivity. Second, sections of the coil convolutions which are effective for the current sensitivity is not sufficiently obtained. The metal disc 6 is turned by the influence or force exerted by that section of the coil 7 which is composed of conductors extending in the radial directions, that is the coil section 11.

The rotating torque $L$ generated about the axis of the coil by the interaction of the electric current $i$ in the movable coil with a uniform perpendicular magnetic field $\vec{H}$.

When the origin of the plane co-ordinate including the coil as the center of rotation is determined by the following formula:

$$d\vec{L} = (i d\vec{l} \times \vec{H}) \times \vec{R}$$

($R$ indicates radius from said origin to a certain point P on the coil. $dl$ indicates a minute interval from said point P to a certain point in the direction of the electric current.)

Accordingly, torque $L$ generated from the whole coil is equal to the value obtained by intergrating $dL$ with respect to the whole length of the coil. The formula also reveals that the element of the coil radially directed is useful to generate torque. Therefore, a coil with a long radially directed element is effective to generate a large rotating torque. In view of this, it is obvious that a spiral coil is subject to a strict limitation and is less effective than a motor type wound wire coil.

It is quite natural to consider increasing the number of windings of coil in order to increase torque. In a spiral coil, torque is not always proportional to the number of windings $N$. In other words, as the average value of the effective element of the coil is reduced by the width $\overline{W}$ of windings of the coil, the torque $L/N$ per winding is reduced.

For example, in this portion 11, while the outermost conductor extends exactly in the radial direction, the direction in which the conductor extends is gradually diverted from the corresponding radial direction as the position of the conductor gets nearer to its innermost position. Therefore, if the innermost conductor portion 13 is diverted by the angle $\alpha$, the effective equivalent radial length exerting the actual turning force on the armature is given by the length of the portion 13 multiplied by $\cos \alpha$, this value being indicated by $l_2$ in FIG. 2.

As to the effectiveness of the coil, the nearer the length of the innermost conductor 13 gets to that of the outermost conductor 12 and the smaller the diverting angle $\alpha$ gets, the greater the turning force becomes for a unit current and unit actual length of conductor. In other words, so far as the diameter of the coil is fixed, the smaller the difference between the effective length $l_1$ of the outermost conductor 12 and the effective length $l_2$ of the innermost conductor 13 gets, that is, the more this difference approaches zero, the greater turning force per unit current and unit actual conductor length is obtained.

In the case of the coil as shown in FIG. 1, the width $W$ cannot be made small so that the difference between the effective lengths $l_1$ and $l_2$ becomes great so that the inner convolution decreases its contribution to the turning force to a considerable extent. Accordingly, if the area covered by the coil is fixed, an increase in the number of conductor convolutions will not result in corresponding rise of current sensitivity.

Other disadvantages of the spiral coil are that force is generated in the direction other than the direction of the rotating torque because of unevenness of the magnetic field and caused by asymmetry between the coil and the magnetic field. These obstacles cause eccentricity, twist and axially directed deflection of the coil during its operation. In most cases these disadvantages are especially due to the force generated along the circumference of the coil.

The drawbacks and disadvantages of the etched coil moving coil meter explained above are overcome by the present invention which in a sense contemplates the provision of a moving coil electric meter comprising means for establishing a longitudinal magnetic field, a substantially flat armature mounted for rotation about a predetermined longitudinal axis and across said magnetic field and a substantially sector-shaped coil affixed to a face of said plate for movement therewith across said magnetic field and formed of a plurality of substantially contiguous convolutions of an insulator covered conductor lying substantially along a face of said armature and occupying an area less than that delineated by its inner periphery.

The coil is formed of wire or conductor having a thin insulating coating and may be wound, stacked or bundled in any suitable manner, and two or more circumferentially arranged similar coils are advantageously provided. The coils are advantageously so dimensioned that the inner ends of the radial or side legs are proximate the armature axis of rotation and the outer ends proximate the rim of the armature and the magnetic field is advantageously confined to between the ends of the coil side legs.

In the present improved structure any material may be used for the disc, and if the material is metal the surface of the disc need not be insulated. As the insulator coating of the conductor it is very desirable to use a material which may be formed into a very thin film, for example an enamel coating, since this would permit the forming of a very narrow-width of the space between the coil convolutions ($d$ in FIG. 1). The width $w$ and the coil thickness $t$ may be readily determined depending upon the manner of forming the conductor. For example, if by rolling process the conductor is formed into such configuration as to have a rectangular cross section with diminished width $w$ but with correspondingly increased thickness $t$, then the number of coil convolutions may be increased with the coil width $W$ within the restricted area and the conductor cross sectional area remaining unchanged. Thus, unlike the case of the etched coil as shown in FIG. 1, the coil of the present invention is free from the restrictions as to increase of the number of convolutions and of the conductor sectional area, and an increase in the number of convolutions and a wide selection of the conductor sectional area may be readily accomplished. Comparing the coil of the present invention with the known coil as shown in FIG. 1, each coil being of the same number of convolutions, the coil width $W$ and the electrical resistance of the former are much smaller than those of the latter. Diminution of the coil width $W$ results in the increased length of the straight portion inside the straight portion, the diverting angle $\beta$ which is smaller than said diverting angle $\alpha$, an increased effective length $l_2$.

With the electric meter according to the present invention, therefore, it is possible to provide a difference between the outermost effective length $l_1$ and the innermost effective length $l_2$ of the width in the straight portion of the fan-shaped coil far less than that in the case wherein the movable section is formed by said etched coil and prolong the effective length overall of the straight portion by extending the end of the coil directed toward the circumference of the straight portion thereof to the outside of the working magnetic field, resulting in a considerable improvement of the current sensitivity of the electric meter. Furthermore, positioning of the arcuate portion of the sector or fan-shaped coil along the circumference thereof outside said working magnetic field can reduce undesirable effects such as any twist occurring in the movable section. Moreover, the armature is provided at the area thereof corresponding to the inner area in the shape of a fan with a large aperture punched out in shape of fan. It is possible, therefore, to reduce the weight of the movable section consisting of the fan-shaped coil and armature, to enhance the starting torque during operation and to enable a control with a relatively low force, so that, for example, a torsion or tight band type may be employed for pivotally mounting this movable section resulting in simplification of the meter in its construction and improvement of the current sensitivity.

The armature is provided with integrally formed lips or tongues has a pawl partially left and folded back formed in the punching operation of said fan-shaped portion, and along a frame formed by said lip, said fan-shaped coil is fitted. Accordingly, it will be understood that the coil of the electric meter according to this invention may be firmly held against any outer shock and easily assembled.

Figure 4:
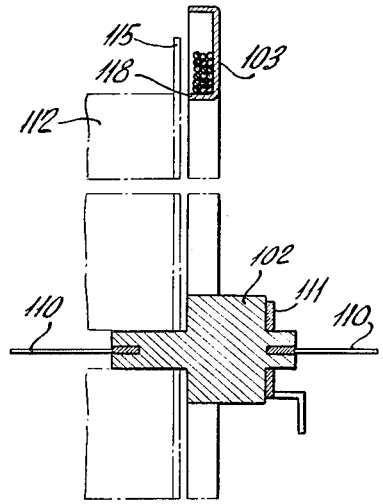
FIG. 4 is an enlarged sectional view taken along line IV — IV in FIG. 3.

Referring now to FIGS. 3 and 4 of the drawings which illustrate a preferred embodiment of the present invention, the reference numeral 101 generally designates an armature which may be stamped of aluminum or formed of any other suitable non-magnetic material. The armature 101 is a substantially flat wheel provided with an opposite pair of large 90° sector shaped openings 105 and two pair of opposing 45° sector shaped openings 106 which delineate a relatively narrow peripheral rim and radial first spokes arranged in quadrature and pairs of opposite second spokes disposed between opposite pairs of the first spokes. The armature rim and spokes are channel shaped, being provided with coplanar base webs and upwardly extending lip flanges or pawls 108 integrally formed therewith. Additional apertures are formed in armature 101 to further reduce the weight thereof.

A hub 102 of insulating material is coaxially secured to armature 101 and is provided with an inner stub shaft registering with a center opening in armature 101 and an outer stepped portion. The armature 101 is supported for swinging about its longitudinal axis by a suitable supported pair of opposite tight or torsion bands 110 coaxial with armature 101 and hub 102 and secured to opposite ends of hub 102.

A pair of opposite fan-shaped or sector-shaped windings 103, are positioned on a face of armature 101 and nest in sector shaped recesses defined by corresponding channel shaped first spokes interconnecting arcuate rim section and the armature central portion. Each winding 103, comprises a plurality of superimposed contiguous layers or coils and a plurality of contiguous convolutions, and embraces corresponding flanges 108 about which the winding extends and is suitably retained in the armature thereby. The straight legs 113 of windings 103 extend substantially radially and are connected at their outer ends by coil arcuate sections concentric with the armature axis and at their inner ends by small arcuate sections proximate the center of the armature. The transverse area occupied by each winding 103 is less than that enclosed or delineated by the inner periphery of the winding and advantageously less than half of such area.

A metal ring 111 having electrodes projecting therefrom is secured to the stepped portion of hub 102 and respective ends of the windings 103 are soldered thereto in the usual manner. A pointer 104 extends across and beyond armature 101 between coils 103, resting on the second armature spokes and is secured and clamped thereto by ears or lugs 109 integrally formed with the rim of armature 101 in alignment with the second spokes.

An assembly is provided for establishing a longitudinal, preferably uniform magnetic field perpendicular to the plane of windings 103 and of an orientation to provide a torque to armature 101 in common direction consequent to the flow of current through windings 103 as applied to the meter terminals. The magnetic field is confined to the area traversed by the winding legs 113 and does not significantly extend beyond the outer or inner ends of radial legs 113 so that the outer arcuate and inner legs are external of the magnetic field or the main part thereof. The magnet assembly may be of conventional construction and includes a circular permanent magnet member 112 along one face of armature 101 and windings 103 with its outer periphery substantially registering with the inner peripheries of the outer arcuate legs of windings 103. A circular metal plate 115 of a diameter slightly larger than that of magnet member 112 is coaxial and in secure tight abutment with the inner face of magnet member 112, between magnet member 112 and armature 101.

As the insulator coating of the winding conductors it is highly advantageous to use an insulator coating which may be formed into a very thin film, for example an enamel coating, since this would permit the achievement of a very narrow width between the coil convolutions ($d$ in FIG. 1). The conductor width $w$ and the coil thickness $t$ may be readily determined depending upon the manner of forming the conductor. For example, if the conductor is formed by a rolling process the conductor is advantageously formed into such configuration as to have a rectangular cross-section with diminished width $w$ but with correspondingly increased thickness $t$, then the number of coil convolutions may be increased within a coil width W with the conductor cross sectional area remaining unchanged. Thus, unlike the case of the etched coil as shown in FIG. 1, the coil of the present invention is free from the restrictions as to increase of the number of convolutions and the relationship of the conductor sectional area, and a very great increase of the number of convolutions and an independent selection of the conductor sectional area may be readily effected. Comparing the coil of the present invention with the known coil as shown in FIG. 1, each coil being of the same number of convolutions, the coil width W and the electrical resistance of the former are much smaller than those of the latter. Diminution of the coil width W results in the increased length of the straight conductive section an inside the adjacent straight conductor section portion the diverting angle $\beta$ being smaller than said diverting angle $\alpha$, an increased effective length $l_2$ is achieved. Accordingly, the difference between the effective lengths $l_1$ and $l_2$ of the outer and inner convolution conductor sections is diminished, which contributes to an increase in the force effective in turning the disc 16, and further the overall electrical resistance of the coil is diminished. Owing to these two effects, with the number of convolutions remaining unchanged, the current and voltage sensitivities of the meter with the coil of the present invention are greatly increased. Thus, with the above described present coil, a moving-coil meter with higher sensitivity than that of the known etched coil construction may be readily produced.

While the example as shown in FIGS. 3 and 4 is provided with two coil portions on one surface of the armature 101 since in the meter according to the present invention the coil width W may be diminished without decreasing the number of convolutions, a greater number of coil portions may be provided without difficulty on the correspondingly divided areas of the disc so that with combinations of multiple coil portions and corresponding multi-polar magnetic fields the current sensitivity may be further increased.

I claim:
1. A moving coil electric meter comprising a substantially flat wheel shaped armature unit integrally formed of a non-magnetic material and including a circular rim and radial spokes, means supporting said armature for swinging about a longitudinal axis substantially perpendicular to the plane of said armature at the center thereof, permanent magnet means for establishing a longitudinal magnetic field perpendicular to the plane of said armature, and a multiple turn winding substantially of sector shape relative to said axis as a center secured to a face of said armature for movement therewith across said magnetic field and formed of a plurality of substantially contiguous convolutions and superimposed layers of an insulator covered conductor, each of said coil convolutions including an arcuate outer leg concentric with said axis and registering with said rim and substantially radial legs converging from the outer ends of said outer leg toward said axis and registering with respective spokes, the transverse area occupied by said winding being less than the area delineated by the inner periphery thereof, said permanent magnet means including a circular permanent magnet coaxial with and proximate a face of said armature and having an outer periphery spaced inwardly at the outer edges of said arcuate outer legs.

2. The meter of claim 1 including a pair of opposite of said windings of similar construction secured to said armature and symmetric relative to said axis.

3. The meter of claim 1 wherein said winding comprises a plurality of superimposed similarly shaped sector shaped multiple turn coils.

4. The meter of claim 1 wherein said radial spokes are perpendicular to each other and comprising a pair of opposite of said windings of similar construction secured to said armature each winding including a plurality of similarly sector shaped multiple turn coils, the outer legs of said windings registering with respective opposite arcuate sections of said rim and the radial legs thereof registering with corresponding wheel spokes.

5. The meter of claim 4 wherein said armature is integrally formed of a non-magnetic metal, said spokes and rim being channel shaped and having upstanding flanges defining sector shaped cores and said windings nesting in said channel shaped rim and spokes and extending around and engaging said cores.

* * * * *